(12) United States Patent
Chen et al.

(10) Patent No.: US 10,308,783 B2
(45) Date of Patent: Jun. 4, 2019

(54) STABILITY OF POLYURETHANE POLYOL BLENDS CONTAINING HALOGENATED OLEFIN BLOWING AGENT

(71) Applicant: Arkema Inc., King of Prussia, PA (US)

(72) Inventors: Benjamin Bin Chen, Wayne, PA (US); Joseph S. Costa, Gilbertsville, PA (US); Laurent Abbas, Narberth, PA (US); Sri R. Seshadri, Holland, PA (US); Gary S. Smith, Collegeville, PA (US)

(73) Assignee: Arkema Inc., King of Prussia, PA (US)

( * ) Notice: Subject to any disclaimer, the term of this patent is extended or adjusted under 35 U.S.C. 154(b) by 307 days.

(21) Appl. No.: 14/430,289

(22) PCT Filed: Sep. 19, 2013

(86) PCT No.: PCT/US2013/060510
§ 371 (c)(1),
(2) Date: Mar. 23, 2015

(87) PCT Pub. No.: WO2014/047230
PCT Pub. Date: Mar. 27, 2014

(65) Prior Publication Data
US 2015/0197614 A1    Jul. 16, 2015

Related U.S. Application Data

(60) Provisional application No. 61/704,626, filed on Sep. 24, 2012.

(51) Int. Cl.
| | | |
|---|---|---|
| *C08J 9/14* | (2006.01) | |
| *C08G 18/66* | (2006.01) | |
| *C08G 18/08* | (2006.01) | |
| *C08G 18/18* | (2006.01) | |
| *C08G 18/40* | (2006.01) | |
| *C08G 18/72* | (2006.01) | |
| *C08J 9/00* | (2006.01) | |
| *C08G 18/48* | (2006.01) | |
| *C08G 18/42* | (2006.01) | |
| *C08G 101/00* | (2006.01) | |

(52) U.S. Cl.
CPC ............. *C08J 9/144* (2013.01); *C08G 18/14* (2013.01); *C08G 18/1808* (2013.01); *C08G 18/1816* (2013.01); *C08G 18/1833* (2013.01); *C08G 18/4018* (2013.01); *C08G 18/4208* (2013.01); *C08G 18/4829* (2013.01); *C08G 18/6674* (2013.01); *C08G 18/72* (2013.01); *C08J 9/0023* (2013.01); *C08J 9/0061* (2013.01); *C08G 2101/0025* (2013.01); *C08J 2203/162* (2013.01); *C08J 2375/08* (2013.01); *C08J 2383/12* (2013.01)

(58) Field of Classification Search
CPC ................ C08G 18/14; C08G 18/1808; C08G 18/1816; C08G 18/1833; C08G 18/4018; C08G 18/4208; C08G 18/4829; C08G 18/6674; C08G 18/72; C08G 2101/0025; C08J 9/0023; C08J 9/0061; C08J 9/144; C08J 2203/162; C08J 2375/08; C08J 2383/12
See application file for complete search history.

(56) References Cited

U.S. PATENT DOCUMENTS

| | | |
|---|---|---|
| 3,438,908 A | 4/1969 | Wallingford et al. |
| 3,669,920 A | 6/1972 | Haggis et al. |
| 3,772,218 A | 11/1973 | Lamplugh et al. |
| 5,395,859 A | 3/1995 | Demmin et al. |
| 5,470,501 A | 11/1995 | Fishback et al. |
| 2010/0181524 A1* | 7/2010 | Elsheikh .................. C08F 2/42 252/78.1 |
| 2010/0216904 A1* | 8/2010 | Loh .................... C08G 18/4018 521/131 |
| 2012/0088856 A1* | 4/2012 | Glos ..................... C08G 18/42 521/112 |
| 2012/0172476 A1 | 7/2012 | Costa et al. |
| 2012/0202904 A1 | 8/2012 | Chen et al. |
| 2012/0238655 A1 | 9/2012 | Lindner et al. |
| 2013/0041048 A1* | 2/2013 | Chen .................. C08G 18/4018 516/12 |

FOREIGN PATENT DOCUMENTS

| | | | |
|---|---|---|---|
| WO | WO 2004/005365 A1 | 1/2004 | |
| WO | WO 2007/053670 A2 | 5/2007 | |
| WO | WO 2011/137033 | * 11/2011 | |

\* cited by examiner

*Primary Examiner* — John M Cooney
(74) *Attorney, Agent, or Firm* — Steven D. Boyd

(57) ABSTRACT

A polyol pre-mix composition includes a blowing agent having a halogenated hydroolefin, a polyol, a catalyst composition, and an antioxidant. The antioxidant may be, for example, a benzene diol or a benzene triol or other polyhydroxy-substituted aromatic compound, which is optionally substituted with one or more substituents such as alkyl groups. A two-part system for producing a thermosetting foam blend includes (a) a polyisocyanate and, optionally, one or more isocyanate compatible raw materials; and (b) the polyol pre-mix composition. A method for producing a thermosetting foam blend includes combining: (a) a polyisocyanate; and (b) the polyol pre-mix composition.

22 Claims, 2 Drawing Sheets

Reactivity vs. Time
Time (Day Ambient)

STABILITY OF POLYURETHANE POLYOL BLENDS CONTAINING HALOGENATED OLEFIN BLOWING AGENT

This present application is the national phase under 35 USC § 371 of prior PCT International Application Number PCT/US2013/060510 filed Sep. 19, 2013 which designated the United States of America and claimed priority to U.S. Provisional Patent Application Ser. No. 61/704,626 filed Sep. 24, 2012.

FIELD OF THE INVENTION

The present invention relates to a method for stabilizing thermosetting foam blends that include halogenated olefinic blowing agent, such as hydrochlorofluoroolefin (HCFO) HCFO-1233zd. More particularly, the present invention relates to a method for stabilizing thermosetting foam blends using a polyol pre-mix composition which includes one or more antioxidants. The present invention further relates to the stable pre-blend formulations and resulting polyurethane or polyisocyanurate foams.

BACKGROUND OF THE RELATED ART

The Montreal Protocol for the protection of the ozone layer mandated the phase-out of the use of chlorofluorocarbons (CFCs). Materials more "friendly" to the ozone layer, such as hydrofluorocarbons (HFCs), e.g., HFC-134a, replaced chlorofluorocarbons. The latter compounds have proven to be green house gases, causing global warming, and were regulated by the Kyoto Protocol on Climate Change. The emerging replacement materials, hydrofluoropropenes, were shown to be environmentally acceptable, i.e., they have zero ozone depletion potential (ODP) and acceptable low global warming potential (GWP).

Currently used blowing agents for thermoset foams include HFC-134a, HFC-245fa, HFC-365mfc, which have relatively high global warming potential, and hydrocarbons such as pentane isomers, which are flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides for a low global warming potential and zero or near zero ozone depletion properties desired.

It is convenient in many applications to provide the components for polyurethane or polyisocyanurate foams in pre-blended formulations. Most typically, the foam formulation is pre-blended into two components. The polyisocyanate and optional isocyanate compatible raw materials comprise the first component, commonly referred to as the A-side component. A polyol or mixture of polyols, surfactant, catalyst, blowing agent, and other isocyanate reactive and non-reactive components comprise the second component, commonly referred to as the B-side component. Accordingly, polyurethane or polyisocyanurate foams are readily prepared by bringing together the A- and B-side components either by hand mix for small preparations and, preferably, machine mix techniques to form blocks, slabs, laminates, pour-in-place panels and other items, spray applied foams, froths, and the like.

Two-component systems, however, have been found to have reduced shelf-life of the B-side composition, especially those systems which use certain hydrohaloolefins, such as, for example, HFO-1234ze and HCFO-1233zd. Normally when a foam is produced by bringing together the A- and B-side components, a good foam is obtained. However, if the polyol pre-mix composition is aged prior to treatment with the polyisocyanate, the foams are of lower quality and may even collapse during the formation of the foam. The poor foam structure is attributed to the reaction of certain catalysts with certain hydrohaloolefins, including HFO-1234ze and HCFO-1233zd, which results in the partial decomposition of the blowing agent and, subsequently, the undesirable modification of the polymeric silicone surfactants.

One way to overcome this problem, for example, is by separating the blowing agent, surfactant, and catalyst, and introducing them using a separate stream from the A- or B-side components. However, a preferred solution would not require such reformulation or process change. A more favorable method may be to stabilize the polyol pre-mix composition to help prevent the decomposition of the blowing agent. As certain catalysts are now known to have a detrimental effect on the halogenated olefinic blowing agents, a stable polyol pre-mix composition is desired which will reduce or eliminate such detrimental interactions. Additionally, a method for stabilizing thermosetting foam blends, the resulting stable pre-mix blend formulations, and the environmentally-friendly polyurethane or polyisocyanurate foams having good foam structure remain highly desirable.

BRIEF SUMMARY OF THE INVENTION

It has now been discovered that antioxidants can function to stabilize polyol pre-mix compositions which contain catalysts and blowing agents. Specifically, it has now been discovered that antioxidants may be favorably used to stabilize a polyol pre-mix B-side containing a halogenated hydroolefin blowing agent. The stabilization method was found to prolong the shelf life of the pre-mix and enhance the foam characteristics of the foam obtained by combining the polyol pre-mix composition with a polyisocyanate.

Accordingly, the polyol pre-mix compositions containing antioxidants are a favorable replacement for traditional polyol pre-mixes which were found to have negative interactions between the catalyst, such as an amine catalyst, and the halogenated hydroolefin. Without being held to any theory, the antioxidants are thought to protect the halogenated hydroolefin from attacking the catalyst, such as an amine catalyst, and prevent the formation of an amine-halogenated hydroolefin intermediate, which in turn forms a amine-halogenated hydroolefin radical. The antioxidants can be used as a stabilizing component of a polyol pre-mix blend, in the process for stabilizing thermosetting foam blends, and in the resultant polyurethane or polyisocyanurate foams. The method of the present invention was found to surprisingly stabilize the polyol pre-mix composition, thereby providing longer shelf life. That is, polyol pre-mix compositions in accordance with the present invention are capable of being stored for long periods of time with little or no detrimental effect on their characteristics and properties. Foams produced by reacting the polyol pre-mix compositions of the present invention with an A-side component containing polyisocyanate were found to have enhanced foam characteristics and may be employed to meet the demands of low or zero ozone depletion potential, lower global warming potential, low VOC content, and low toxicity, thereby making them environmentally-friendly.

In one embodiment, the present invention provides a polyol pre-mix composition which comprises a blowing agent, a polyol, a catalyst composition, and an antioxidant.

The catalyst composition may comprise an amine catalyst, a non-amine catalyst, or a mixture thereof. The blowing agent may comprise a halogenated hydroolefin and, optionally, hydrofluorocarbons (HFCs), hydrofluoroethers (HFEs), hydrocarbons, alcohols, aldehydes, ketones, ethers/diethers, esters, or $CO_2$ generating materials, or combinations thereof. In at least one embodiment, the hydrocarbons are selected from the group consisting of normal pentane, isopentane, cyclopentane, neopentane, and butane The polyol pre-mix composition may further comprise a surfactant, which may be a silicone or non-silicone surfactant. The polyol pre-mix composition may further comprise a flame retardant or suppressor.

In another embodiment the present invention provides a two-part system for producing a thermosetting foam blend, wherein the system comprises: (a) as a first part, a polyisocyanate and, optionally, one or more isocyanate compatible raw materials; and (b) as a second part, a polyol pre-mix composition which comprises a blowing agent, a polyol, a catalyst composition, and an antioxidant. The catalyst composition may comprise an amine catalyst, a non-amine catalyst, or a mixture thereof, and may also comprise a surfactant and/or a flame retardant or suppressor.

In a further embodiment, the present invention is a method for producing a thermosetting foam blend which comprises combining: (a) a polyisocyanate and, optionally, one or more isocyanate compatible raw materials; and (b) a polyol pre-mix composition which comprises a blowing agent, a polyol, a catalyst composition, and an antioxidant. The catalyst composition may comprise an amine catalyst, a non-amine catalyst, or a mixture thereof. The polyol pre-mix composition may further comprise a surfactant, which may be a silicone or non-silicone surfactant. The polyol pre-mix composition may also comprise a flame retardant or suppressor.

In yet another embodiment, the present invention provides a mixture suitable for providing a polyurethane or polyisocyanurate foam having uniform cell structure with little or no foam collapse, wherein the mixture comprises: (a) a polyisocyanate and, optionally, one or more isocyanate compatible raw materials; and (b) a polyol pre-mix composition which comprises a blowing agent, a polyol, a catalyst composition, and an antioxidant. The catalyst composition may comprise an amine catalyst, a non-amine catalyst, or a mixture thereof. The polyol pre-mix composition may further comprise a surfactant and/or a flame retardant or suppressor. Accordingly, polyurethane or polyisocyanurate foams are readily prepared by bringing together the A- and B-side components either by hand mix for small preparations and, preferably, machine mix techniques to form blocks, slabs, laminates, pour-in-place panels and other items, spray applied foams, froths, and the like.

It has unexpectedly been discovered that antioxidants function to stabilize polyol pre-mix compositions by offsetting the decomposition of hydrohaloolefins. The use of one or more antioxidants in a polyol pre-mix blend composition surprisingly produces a thermoset blend composition that has improved shelf-life stability.

DETAILED DESCRIPTION OF CERTAIN EMBODIMENTS OF THE INVENTION

Figure 1:
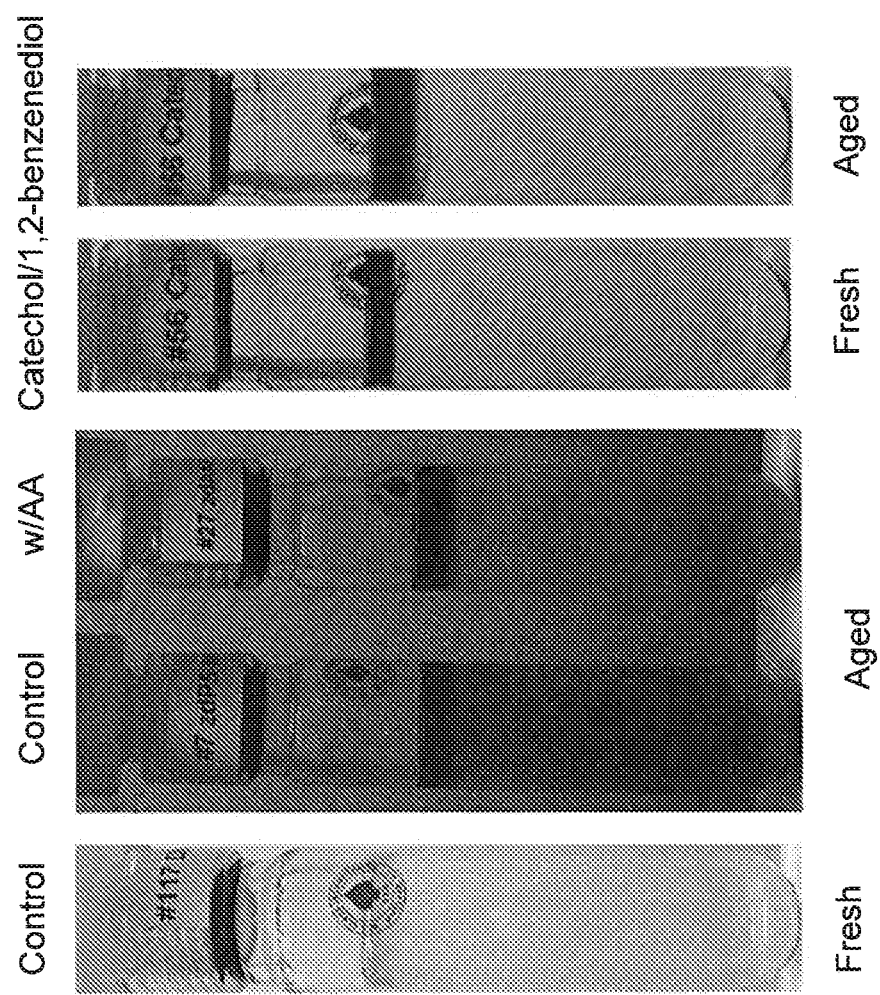
FIG. 1 shows solutions comprising a blowing agent and catalyst after aging and when freshly prepared.

Polyurethane foaming was studied by using halogenated olefins such as hydrochlorofluoroolefin 1-chloro-3,3,3-trifluoropropene, commonly referred to as HCFO-1233zd. The blends for polyurethane foam include a polyol, a catalyst, a halogenated olefin blowing agent, and an antioxidant. It is now surprisingly found that the antioxidant used in the present invention results in the improved stability of the foam blends over time. Additionally, the resultant foams were surprisingly found to have a uniform cell structure with little or no foam collapse.

Without being held to the theory, it is believed that the problem of the diminished shelf-life stability of the two-component systems, especially those using HCFO-1233zd, is related to the reaction of the halogenated olefins with the catalyst, such as an amine catalyst. The reaction produces an intermediate, which in turn forms an oxidizing radical. Subsequent reactions produce hydrofluoric acid (HF) which attacks the silicone surfactant in situ. This side reaction was confirmed by hydrogen, fluorine, and silicon nuclear magnetic resonance (NMR) spectra and gas chromatography-mass spectrometry (GC-MS). This effect can be summarized as the nucleophilic attack of the catalyst, for example an amine catalyst, on the $C_1$ of the HCFO-1233zd halogenated olefin. Accordingly, the embodiments of the present invention reduce such detrimental interaction by preventing the halogenated olefin from reacting with the catalyst. Without being held to any theory, the reduction in degradation of the olefin caused by the catalyst is thought to be tied to primary antioxidants acting to protect the halogenated olefin blowing agent. This protective functionality of the primary antioxidants prevents the detrimental interaction of the catalyst with halogenated olefins, such as HCFO-1233zd, and the subsequent resulting HF production. Secondary antioxidants may also function to decompose peroxides. It is also believed that the antioxidants may provide at least some protection to the blowing agent even when a non-amine catalyst is used.

Generally speaking, an amount of one or more antioxidants is utilized which is effective to improve the stability of the polyol pre-mix composition over the stability observed in the same composition in the absence of any antioxidants and/or to improve the quality of the foam obtained by combining the polyol pre-mix composition with an A-side comprised of polyisocyanate as compared to the foam quality obtained in the absence of any antioxidants. Such amount may vary depending upon the details of a particular formulation, including, for example, the types and amounts of blowing agent, catalyst, and/or surfactant utilized as well as the particular antioxidant(s) selected, but may be readily determined by routine experimentation. Typically, however, an amount of primary antioxidant which is at least about 0.01 wt % based on the total weight of the polyol pre-mix will be suitable.

Generally speaking, it is unnecessary to employ a primary antioxidant content of greater than about 20 wt % based on the total weight of the polyol pre-mix. For example, the polyol pre-mix composition may contain about 0.01 wt % to about 20 wt % primary antioxidant based on the total weight of the polyol pre-mix The present invention thus provides a polyol pre-mix composition which comprises a blowing agent, a polyol, a catalyst composition, and an antioxidant. The polyol pre-mix composition may further comprise a surfactant and/or a metal salt. The catalyst composition may comprise an amine catalyst, a non-amine catalyst, or a mixture thereof.

In another embodiment the present invention provides a stabilized thermosetting foam blend which comprises: (a) a polyisocyanate and, optionally, isocyanate compatible raw materials; and (b) a polyol pre-mix composition which comprises a blowing agent, a polyol, a catalyst composition, and an antioxidant. The polyol pre-mix composition may further comprise a surfactant and/or a metal salt. The catalyst composition may comprise an amine catalyst, a non-amine catalyst, or a mixture thereof.

In yet another embodiment, the present invention is a method for stabilizing thermosetting foam blends which comprises combining: (a) a polyisocyanate and, optionally, isocyanate compatible raw materials; and (b) a polyol pre-mix composition which comprises a blowing agent, a polyol, a catalyst composition, and an antioxidant. The polyol pre-mix may further comprise a surfactant and/or a metal salt. The catalyst composition may comprise an amine catalyst, a non-amine catalyst, or a mixture thereof. The mixture according to this method produces a stable foamable thermosetting composition which can be used to form polyurethane or polyisocyanurate foams.

In at least one embodiment, the antioxidant is a primary antioxidant that limits the reaction between the blowing agent and the catalyst. In at least one embodiment, the primary antioxidant is a monohydroxy-substituted aromatic compound or a polyhydroxy-substituted aromatic compound, i.e., a compound containing at least one aromatic ring in which hydrogen atoms on the aromatic ring are substituted by two or more hydroxyl groups, and optionally one or more substituents other than hydroxyl. According to at least one embodiment, the primary antioxidant is chosen from benzene diols and triols. The benzene diols and triols may be substituted (i.e., the aromatic ring may be substituted with one or more groups other than hydrogen and hydroxyl) or unsubstituted (i.e., the aromatic ring does not bear any substituents other than hydrogen and hydroxyl). Substitutions may include, for example, alkyl groups (both straight chain and branched as well as cycloalkyl), such as methyl, ethyl, propyl, and butyl (e.g., n-butyl, sec-butyl, tert-butyl) groups, as well as other types of substituents such as aryl, aryloxy, substituted carbonyl, alkaryl, halogen, alkoxy, or cyano groups or the like.

According to at least one embodiment, the primary antioxidant is chosen from substituted or unsubstituted 1,2-benzenediols, 1,3-benzenediols, 1,4-benzenediols, and mixtures thereof. In at least one embodiment, the primary antioxidant is chosen from substituted or unsubstituted 1,2-benzenediols and 1,4-benzenediols. In at least one further embodiment, the primary antioxidant comprises a substituted or unsubstituted 1,2-benzenediol.

In at least one embodiment, the primary antioxidant is chosen from benzenetriols, which may optionally be substituted with at least one alkyl group. According to at least one embodiment, the benzenetriols may be chosen from substituted or unsubstituted compounds of 1,2,4-benzenetriol, 1,2,3-benzenetriol, and 1,3,5-benzenetriol.

Examples of illustrative polyhydroxy-substituted aromatic compounds suitable for use in the present invention include, but are not limited to, 1,2-benzenediol (catechol), 1,4-benzenediol (hydroquinone), 1,3-benzenediol (resorcinol), napthohydroquinones, anthrohydroquinones, catechins, alkyl-substituted phenols, and the like.

In at least one embodiment, the polyol pre-mix comprises 0.01 wt % to 20 wt % primary antioxidant based on the total weight of the polyol pre-mix. In other embodiments, the polyol pre-mix comprises at least 0.01 wt % primary antioxidant based on the total weight of the polyol pre-mix, such as at least 0.1 wt %, at least 0.5 wt %, at least 1 wt %, or at least 2 wt % primary antioxidant based on the total weight of the polyol pre-mix. In certain embodiments, the polyol pre-mix comprises no more than 20 wt % primary antioxidant based on the total weight of the polyol pre-mix, such as no more than 15 wt %, no more than 10 wt %, no more than 8 wt %, no more than 7 wt %, no more than 6 wt %, or no more than 5 wt % primary antioxidant based on the total weight of the polyol pre-mix.

In at least one embodiment, the polyol pre-mix may comprise a total amount of antioxidant ranging from 0.01 wt % to about 40 wt % based on the total weight of the polyol pre-mix. In at least one further embodiment, the polyol pre-mix comprises at least 0.01 wt % total antioxidant based on the total weight of the polyol pre-mix, such as at least 0.1 wt %, at least 0.5 wt %, at least 1 wt %, or at least 2 wt % total antioxidant based on the total weight of the polyol pre-mix. In certain embodiments, the polyol pre-mix comprises no more than 20 wt % total antioxidant based on the total weight of the polyol pre-mix, such as no more than 15 wt %, no more than 10 wt %, no more than 8 wt %, no more than 7 wt %, no more than 6 wt %, or no more than 5 wt % total antioxidant based on the total weight of the polyol pre-mix The polyol pre-mix according to the present invention may further comprise a secondary antioxidant. The secondary antioxidant may decompose peroxides in the composition. Non-limiting examples of secondary antioxidants that may be used in accordance with the present invention, include: furan, furfuryl alcohol, furfurylamine, 2,5-dimethylfuran, N-methylfurfurylamine, mono-tert-butyl malonate, N,N-diethylacetamide, N,N-diethylacetamide, ethylene glycol dimethyl ether, N,N-diethylhydroxylamine, N,N-diethylhydroxylamine, N,N-diethylhydroxylamine, sodium sulfite, triethylphosphite, triphenylphosphite, ethylene-sulfite, a-methylstyrene, carbonhydrazide, tris(2-chloroethyl)phosphite, tris(2,4-di-tret-butylphenyl)phosphite, dimethylglyoxime, tempo (2,2,6,6-tetramethylpiperidin-1-yl) oxidanyl), 4-hydroxy-tempo, DMDO (1,8-dimercapto-3,6-dioxaoctane), tert-butanol, 2-(tert-butylamino) ethanol, dimethyl sulfite, trimethyl phosphite, triphenylphosphine, diphenyl sulfide, ethyl phenyl sulfide, butyl sulfide, dioctyl sulfide, boric acid, triisopropyl borate, triethyl borate, trimethoxyboroxine, isopropylboronic, 1,2-thiodiethanol, DMSO (dimethyl sulfoxide), tributylphosphine, phenylboronic acid, N-propyl gallate, N,N,N',N'-tetramethyl-p-phenylenediamine, N,N,N',N'-tetramethyl-1,3-phenylenediamine, 1,3-phenylenediamine, N,N-dimethyl-p-phenylenediamine, gallic acid, N-methyl-1,2-phenylenediamine, nitrosobenzene, P-phenylenediamine, 2-methyl-2-nitrosopropane, lauryl gallate, octyl gallate. In at least one embodiment, the secondary antioxidant is chosen from phenylene diamine, phosphites, sulfides, sulfites, and mercaptides.

In at least one embodiment, the polyol pre-mix comprises 0.01 wt % to 20 wt % secondary antioxidant based on the total weight of the polyol pre-mix. In other embodiments, the polyol pre-mix comprises at least 0.01 wt % secondary antioxidant based on the total weight of the polyol pre-mix, such as at least 0.1 wt %, at least 0.5 wt %, at least 1 wt %, or at least 2 wt % secondary antioxidant based on the total weight of the polyol pre-mix. In certain embodiments, the polyol pre-mix comprises no more than 20 wt % secondary antioxidant based on the total weight of the polyol pre-mix, such as no more than 15 wt %, no more than 10 wt %, no more than 8 wt %, no more than 7 wt %, no more than 6 wt %, or no more than 5 wt % secondary antioxidant based on the total weight of the polyol pre-mix.

In at least one embodiment of the present invention, the polyol pre-mix comprises at least one primary and secondary antioxidant. In at least one further embodiment, the polyol pre-mix comprises at least one primary antioxidant, but no secondary antioxidant.

The antioxidant may be added directly into the polyol blends, or it may be dissolved in a solvent such as water, an alcohol, a ployetherpolyol, an ester, a polyesterpolyol, an ether, a ketone, a hydrocarbon such as iso, normal, cyclo, and neopentane, butane, a blowing agent, a silicone and or nonsilicone surfactant, a tertiary amine catalyst, a metallic catalyst, and a flame retardant or suppressor, then formulated into b-side blends. In at least one embodiment, the antioxidant is dissolved in a solvents chosen from ethylene glycol, di or tri-ethylene glycol, pentanes, HFO-1233zd, and polyols.

The antioxidant of the present invention may be employed in polyol pre-mix compositions containing various amine catalysts. Traditional amine catalysts have been tertiary amines, such as triethylenediamine (TEDA), dimethylcyclohexylamine (DMCHA), and dimethylethanolamine (DMEA). Amine catalysts are generally selected based on whether they drive the gelling reaction or the blowing reaction. In the gelling reaction, polyfunctional isocyanates react with polyols to form polyurethane. In the blowing reaction, the isocyanate reacts with water to form polyurea and carbon dioxide. Amine catalysts can also drive the isocyanate trimerization reaction. These reactions take place at different rates; the reaction rates are dependent on temperature, catalyst level, catalyst type and a variety of other factors. However, to produce high-quality foam, the rates of the competing gelling and blowing reactions must be properly balanced. If the blowing reaction occurs faster than the gelling reaction, the gas generated by the reaction may expand before the polymer is strong enough to contain it and internal splits or foam collapse can occur. In contrast, if the gelling occurs faster than the blowing reaction, the foam cells will remain closed, causing the foam to shrink as it cools. Molecular structure gives some clue to the strength and selectivity of the catalyst. Blow catalysts generally have an ether linkage two carbons away from a tertiary nitrogen. Strong gel catalysts may contain alkyl-substituted nitrogens, while weaker gel catalysts may contain ring-substituted nitrogens. Trimerization catalysts may contain the triazine structure, or are quaternary ammonium salts. Catalysts that contain a hydroxyl group or an active amino hydrogen may also be employed.

Amine catalysts are generally selected based on whether they drive: the gel catalysis (or polymerization) reaction, in which polyfunctional isocyanates react with polyols to form polyurethane, or the blow catalysis (or gas-producing) reaction, in which the isocyanate reacts with water to form polyurea and carbon dioxide. Amine catalysts can also drive the isocyanate trimerization reaction. Since some amine catalysts will drive all three reactions to some extent, they are often selected based on how much they favor one reaction over another. As described above, catalysts function to control and balance the gelling and blowing reactions. Tertiary amine catalysts have their own specific catalytic characteristics such as gelling, blowing, and crosslinking activity. As would be appreciated by one having ordinary skill in the art, these catalytic activities have a strong relationship with rise profile, blowing efficiency, moldability, productivity, and other properties of the resulting foam.

Accordingly, the polyol pre-mix compositions of the present invention include an antioxidant in addition to a variety of amine catalysts to balance the blow, gel, and trimerization catalysis reactions and produce a foam having the desired properties. For example, the polyol pre-mix composition of the present invention may contain one or more antioxidants in combination with one or more oxygen-containing amine catalysts. The polyol pre-mix composition of the present invention may alternatively, or additionally, include one or more non-oxygen-containing amine catalysts and/or non-amine catalysts.

The oxygen-containing amine catalysts which may be used in the present invention include those amines containing ether and/or a hydroxyl group. For example, the oxygen-containing amine catalyst may be an alkanolamine, ether amine or a morpholine group-containing catalyst such as an N-alkyl substituted morpholine. The catalyst may contain one, two, three or more nitrogen atoms in the form of amine functional groups. In one embodiment, all of the amine groups present in the catalyst molecule are tertiary amine groups. The catalyst, in one embodiment, may contain two, three or more oxygen atoms; these oxygen atoms may be present in the form of ether groups, hydroxyl groups or both ether and hydroxyl groups. Suitable oxygen-containing amine catalysts include compounds corresponding to the following chemical structure:

wherein $R^1$ and $R^2$ are the same or different and are each a $C_1$-$C_6$ alkyl group, such as methyl, and/or an alkanol group, such as —$CH_2CH_2OH$ or $CH_2CH(CH_3)OH$; X is $O(CH_2)_2$Y, OH, or $NR^3(CH_2)_2$Y, where $R^3$ is a $C_1$-$C_6$ alkyl group, such as methyl, or an alkanol group, such as —$CH_2CH_2OH$ or $CH_2CH(CH_3)OH$; and Y is OH or $NR^4R^5$, where $R^4$ and $R^5$ are the same or different and are each a $C_1$-$C_6$ alkyl group, such as methyl, and/or an alkanol group such as —$CH_2CH_2OH$ or —$CH_2CH(CH_3)OH$; subject to the proviso that the compound contains at least one ether and/or hydroxyl group.

Exemplary oxygen-containing amine catalysts include:
bis-(2-dimethylaminoethyl)ether;
N,N-dimethylethanolamine;
N-ethylmorpholine;
N-methylmorpholine;
N,N,N'-trimethyl-N'-hydroxyethyl-bisaminoethylether;
N-(3-dimethylaminopropyl)-N,N-diisopropanolamine;
N,N-bis(3-dimethylaminopropyl)-N-isopropanolamine;
2-(2-dimethylaminoethoxyl)ethanol;
N,N,N'-trimethylaminoethyl-ethanolamine; and
2,2'-dimorpholinodiethylether, and mixtures thereof.

Exemplary non-oxygen-containing amine catalysts include: 1,3-propanediamine, N'-(3-dimethylamino)propyl-N,N-dimethyl-, triethylenediamine, 1,2-dimethylimidazole, N,N,N'N'-tetramethylhexanediamine, N,N'',N''-trimethyl-aminoethylpiperazine, N,N,N',N'tetramethylethylenediamine, N,N-dimethylcyclohexylamine (DMCHA), 1,4-diazadicyclo[2,2,2]octane (DABCO), N,N',N''-tris(3-dimethylamino-propyl)hexahydrotriazine, N,N-dimethylbenzylamine, N,N,N',N'',N''-pentaamethyldipropylenetriamine, N,N'-diethylpiperazine, dicyclohexylmethylamine, ethyldiisopropylamine, dimethylcyclohexylamine, dimethylisopropylamine, methylisopropylbenzylamine, methylcyclopentylbenzylamine, isopropyl-sec-butyl-trifluoroethylamine, diethyl-(α-phenyethyl) amine, tri-n-propylamine, dicyclohexylamine, t-butylisopropylamine, di-t-butylamine, cyclohexyl-t-butylamine, di-sec-butylamine, dicyclopentylamine, di-(α-trifluoromethylethyl)amine, di-(α-phenylethyl)amine, triphenylmethylamine, pentamethyldiethylenetriamine (PMDETA) and 1,1-diethyl-n-propylamine.

Exemplary non-amine catalysts include organometallic compounds containing bismuth, lead, tin, antimony, cadmium, cobalt, iron, thorium, aluminum, mercury, zinc, nickel, cerium, molybdenum, titanium, vanadium, copper, manganese, zirconium, magnesium, calcium, sodium, potassium, lithium or combination thereof such as stannous octoate, dibutyltin dilaurate (DBTDL), dibutyltin mercaptide, phenylmercuric propionate, lead octoate, potassium acetate/octoate, magnesium acetate, titanyl oxalate, potassium titanyl oxalate, quaternary ammonium formates, and ferric acetylacetonate, and combinations thereof.

Bismuth and zinc carboxylates may be favorably employed over mercury and lead based catalysts, due to the toxicity and the necessity to dispose of mercury and lead catalysts and catalyzed material as hazardous waste in the United States, however these may have shortcomings in pot life and in certain weather conditions or applications. Alkyl tin carboxylates, oxides and mercaptides are used in all types of polyurethane applications. Organometallic catalysts are useful in two-component polyurethane systems. These catalysts are designed to be highly selective toward the isocyanate-hydroxyl reaction as opposed to the isocyanate-water reaction, thus avoiding bubble generation at low levels of moisture.

As would be appreciated by one having ordinary skill in the art, the catalysts of the present invention may be selected, based on the various factors such as temperature, to produce balanced gelling and blowing reaction rates. Balancing the two competing reactions will produce high-quality foam structure. An ordinarily skilled artisan would further appreciate that the catalysts of the present invention may be employed alone, or in combination with organometallic catalysts, to achieve the desired functional properties and characteristics of the resulting foam structure. This includes, but is not limited to, other catalysts that have gelling or blowing reaction functionality.

The blowing agent in the thermosetting foam blends in one embodiment of the present invention includes an unsaturated halogenated hydroolefin such as a hydrofluoroolefin (HFO), hydrochlorofluoroolefin (HCFO), or mixtures thereof, and, optionally, one or more hydrofluorocarbons (HFCs), hydrofluoroethers (HFEs), hydrocarbons, alcohols, aldehydes, ketones, ethers/diethers or carbon dioxide generating materials. The preferred blowing agent in the thermosetting foam blend of the present invention is a hydrofluoroolefin (HFO) or a hydrochlorofluoroolefin (HCFO), alone or in a combination. Preferred hydrofluoroolefin (HFO) blowing agents contain 3, 4, 5, or 6 carbons, and include but are not limited to pentafluoropropenes, such as 1,2,3,3,3-pentafluoropropene (HFO-1225ye); tetrafluoropropenes, such as 1,3,3,3-tetrafluoropropene (HFO-1234ze, E and Z isomers), 2,3,3,3-tetrafluoropropene (HFO-1234yf), and 1,2,3,3-tetrafluoropropene (HFO-1234ye); trifluoropropenes, such as 3,3,3-trifluoropropene (HFO-1243zf); tetrafluorobutenes, such as (HFO-1345); pentafluorobutene isomers, such as (HFO-1354); hexafluorobutene isomers, such as (HFO-1336); heptafluorobutene isomers, such as (HFO-1327); heptafluoropentene isomers, such as (HFO-1447); octafluoropentene isomers, such as (HFO-1438); nonafluoropentene isomers, such as (HFO-1429); and hydrochlorofluoroolefins, such as 1-chloro-3,3,3-trifluoropropene (HCFO-1233zd) (E and Z isomers), 2-chloro-3,3,3-trifluoropropene (HCFO-1233xf), HCFO-1223, 1,2-dichloro-1,2-difluoroethene (E and Z isomers), 3,3-dichloro-3-fluoropropene, 2-chloro-1,1,1,4,4,4-hexafluorobutene-2(E and Z isomers), and 2-chloro-1,1,1,3,4,4,4-heptafluorobutene-2(E and Z isomers). Preferred blowing agents in the thermosetting foam blends of the present invention include unsaturated halogenated hydroolefins with normal boiling points less than about 60° C. Preferred hydrochlorofluoroolefin and hydrofluoroolefin blowing agents include, but are not limited to, 1-chloro-3,3,3-trifluoropropene; E and/or Z HCFO-1233zd; 1,3,3,3-tetrafluoropropene; E and/or Z HFO-1234ze; and HFO-1336, both cis and trans isomers.

In at least one embodiment, the blowing agent is chosen from all isomers of HFO-1233, HFO-1234, HFO-1354, and HFO-1336.

The halogenated olefinic blowing agents in the thermosetting foam blend of the present invention can be used alone or in combination with other blowing agents, including but not limited to:

(a) hydrofluorocarbons including but not limited to difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluobutane (HFC365mfc) and 1,1,1,2,2,3,4,5,5,5-decafluoropentane (HFC4310mee), (b) hydrocarbons including but not limited to, pentane isomers and butane isomers;

(c) hydrofluoroethers (HFE) such as, $C_4F_9OCH_3$ (HFE-7100), $C_4F_9OC_2H_5$ (HFE-7200), $CF_3CF_2OCH_3$ (HFE-245cb2), $CF_3CH_2CHF_2$ (HFE-245fa), $CF_3CH_2OCF_3$ (HFE-236fa), $C_3F_7OCH_3$ (HFE-7000), 2-trifluoromethyl-3-ethoxydodecofluorohexane (HFE 7500), 1,1,1,2,3-hexafluoro-4-(1,1,2,3,3,3-hexafluoropropoxy)-pentane (HFE-7600), 1,1,1,2,2,3,5,5,5-decafluoro-3-methoxy-4-(trifluoromethyl)pentane (HFE-7300), ethyl nonafluoroisobutyl ether/ethyl nonafluorobutyl ether (HFE 8200), $CHF_2OCHF_2$, $CHF_2—OCH_2F$, $CH_2F—OCH_2F$, $CH_2F—O—CH_3$, cyclo-$CF_2CH_2CF_2—O$, cyclo-$CF_2CF_2CH_2—O$, $CHF_2—CF_2CHF_2$, $CF_3CF_2—OCH_2F$, $CHF_2—O—CHFCF_3$, $CHF_2—OCF_2CHF_2$, $CH_2F—O—CF_2CHF_2$, $CF_3—O—CF_2CH_3$, $CHF_2CHF—O—CHF_2$, $CF_3—O—CHFCH_2F$, $CF_3CHF—O—CH_2F$, $CF_3—O—CH_2CHF_2$, $CHF_2—O—CH_2CF_3$, $CH_2FCF_2—O—CH_2F$, $CHF2-O—CF_2CH_3$, $CHF_2CF_2—O—CH_3$ (HFE254pc), $CH_2F—O—CHFCH_2F$, $CHF_2—CHF—O—CH_2F$, $CF_3—O—CHFCH_3$, $CF_3CHF—O—CH_3$, $CHF_2—O—CH_2CHF_2$, $CF_3—O—CH_2CH_2F$, $CF_3CH_2—O—CH_2F$, $CF_2HCF_2CF_2—O—CH_3$, $CF_3CHFCF_2—O—CH_3$, $CHF_2CF_2CF_2—O—CH_3$, $CHF_2CF_2CH_2—OCHF_2$, $CF_3CF_2CH_2—O—CH_3$, $CHF_2CF_2—O—CH_2CH_3$, $(CF_3)_2CF—O—CH_3$, $(CF_3)_2CH—O—CHF_2$, and $(CF_3)_2CH—O—CH_3$, and mixtures thereof; and (d) C1 to C5 alcohols, C1 to C4 aldehydes, C1 to C4 ketones, C1 to C4 ethers and diethers and carbon dioxide generating materials.

The thermosetting foam blends of the present invention include one or more components capable of forming foam having a generally cellular structure and blowing agent(s). Examples of thermosetting compositions include polyurethane and polyisocyanurate foam compositions, preferably low-density foams, flexible or rigid.

The invention also relates to foam, and preferably closed cell foam, prepared from a thermosetting foam formulation to which has been added a stabilizing amount of an ester. When an ester is employed, the order and manner in which the blowing agent and ester combination of the present invention is formed and/or added to the foamable composition does not generally affect the operability of the present invention. For example, in the case of polyurethane foams, it is possible that the various components of the blowing agent and ester combination not be mixed in advance of introduction to the foaming equipment, or even that the components are not added to the same location in the foaming equipment. Thus, in certain embodiments it may be desired to introduce one or more components of the blowing agent and ester combination in such a way that the components will come together in the foaming equipment. Nevertheless, in certain embodiments, the components of the blowing agent and ester combination are combined in advance and introduced together into the foamable composition, either directly or as part of a pre-mix that is then further added to other parts of the foamable composition.

In certain embodiments in the preparation of polyurethane polyol foams, the B-side polyol pre-mix composition can include polyols, silicone or non-silicone based surfactants, catalysts, flame retardants or suppressors, acid scavengers, radical scavengers, fillers metal salts, and other stabilizers or inhibitors.

The polyol component, which can include mixtures of polyols, can be any polyol which reacts in a known fashion with an isocyanate in preparing a polyurethane or polyisocyanurate foam. Exemplary polyols include: glycerin-based polyether polyols such as Carpol® GP-700, GP-725, GP-4000, GP-4520; amine-based polyether polyols such as Carpol® TEAP-265 and EDAP-770, Jeffol® AD-310; sucrose-based polyether polyols, such as Jeffol® SD-360, SG-361, and SD-522, Voranol® 490, and Carpol® SPA-357; Mannich-based polyether polyols, such as Jeffol® R-425X and R-470X; sorbitol-based polyether polyols, such as Jeffol® S-490; and aromatic polyester polyols such as Terate® 2541 and 3510, Stepanpol® PS-2352, and Terol® TR-925.

The polyol pre-mix composition may also contain a surfactant. The surfactant is used to form a foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to foaming or during foam rise. Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures.

Exemplary silicone surfactants include polysiloxane polyoxyalkylene block co-polymer such as B8404, B8407, B8409, B8462 and B8465 available from Goldschmidt; DC-193, DC-197, DC-5582, and DC-5598 available from Air Products; and L-5130, L5180, L-5340, L-5440, L-6100, L-6900, L-6980, and L6988 available from Momentive. Exemplary non-silicone surfactants include salts of sulfonic acid, alkali metal salts of fatty acids, ammonium salts of fatty acids, oleic acid, stearic acid, dodecylbenzenedisulfonic acid, dinaphthylmetanedisulfonic acid, ricinoleic acid, an oxyethylated alkylphenol, an oxyethylated fatty alcohol, a paraffin oil, a caster oil ester, a ricinoleic acid ester, Turkey red oil, groundnut oil, a paraffin fatty alcohol, or combinations thereof. Typical use levels of surfactants are from about 0.4 to 6 wt % of polyol pre-mix, preferably from about 0.8 to 4.5 wt %, and more preferably from about 1 to 3 wt %.

Exemplary flame retardants include trichloropropyl phosphate (TCPP), triethyl phosphate (TEP), diethyl ethyl phosphate (DEEP), diethyl bis(2-hydroxyethyl) amino methyl phosphonate, brominated anhydride based ester, dibromoneopentyl glycol, brominated polyether polyol, melamine, ammonium polyphosphate, aluminum trihydrate (ATH), tris (1,3-dichloroisopropyl)phosphate, tri(2-chloroethyl)phosphate, tri(2-chloroisopropyl)phosphate, chloroalkyl phosphate/oligomeric phosphonate, oligomeric chloroalkyl phosphate, brominated flame retardant based on pentabromo diphenyl ether, dimethyl methyl phosphonate, diethyl N,N bis(2-hydroxyethyl) amino methyl phosphonate, oligomeric phosphonate, and derivatives thereof.

In at least one embodiment, the polyol pre-mix comprises at least one metal salt, such as metal carboxylates, metal acetylacetonates, metal alcoholates, metal amidinates, such as those disclosed in U.S. Pat. No. 7,485,729, herein incorporated by reference, for example, alkali earth carboxylates, alkali earth acetylacetonates and alcoholates, alkali carboxylates, alkali acetylacetonates and alcoholates, and carboxylates, acetylacetonates and alcoholates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba), bismuth (Bi). For example, metal carboxylates having one or more functional carboxyl groups may be employed. The metal carboxylate may comprise a metal salt of a C1-C21 carboxylic acid. For example, the metal carboxylate may comprise a metal salt of a C1-C21 straight chain or branched aliphatic monocarboxylic acid. Similarly, a metal alcoholate may be employed such as, for example, a metal alcoholate which comprises a metal salt of a C1-C21 alcohol. The metal alcoholate may comprise a metal salt of a C1-C21 straight chain or branched aliphatic alcohol. Suitable carboxylic acids include, but are not limited to, formic acid, octanoic acid, 2-ethylhexanoic acid and the like. Suitable alcohols include methanol, ethanol, isopropanol, and the like. In one embodiment, the metal carboxylate comprises a carboxylate of a metal selected from the group consisting of Zn, Co, Ca, Mg, Bi, K, and Sn. Suitable metal carboxylates may include, for example, magnesium formate, magnesium benzoate, magnesium octoate, calcium formate, calcium octoate, zinc octoate, cobalt octoate, stannous octoate, bismuth octoate, potassium octoate, zinc acetylacetonate, cobalt acetylacetonate, magnesium acetylacetonate, bismuth acetylacetonate, potassium acetylacetonate, tin acetylacetonate, and calcium acetylacetonate.

In certain embodiments, acid scavengers, radical scavengers, and/or other stabilizers/inhibitors are included in the pre-mix. Exemplary stabilizer/inhibitors include 1,2-epoxy butane; glycidyl methyl ether; cyclic-terpenes such as dl-limonene, 1-limonene, d-limonene; 1,2-epoxy-2,2-methylpropane; nitromethane; diethylhydroxyl amine; alpha methylstyrene; isoprene; p-methoxyphenol; m-methoxyphenol; dl-limonene oxide; hydrazines; 2,6-di-t-butyl phenol; hydroquinone; organic acids such as carboxylic acid, dicarboxylic acid, phosphonic acid, sulfonic acid, sulfamic acid, hydroxamic acid, formic acid, acetic acid, propionic acid, butyric acid, caproic acid, isocaprotic acid, 2-ethylhexanoic acid, caprylic acid, cyanoacetic acid, pyruvic acid, benzoic acid, oxalic acid, malonic acid, succinic acid, adipic acid, azelaic acid, trifluoroacetic acid, methanesulfonic acid, benzenesulfonic acid, and combinations thereof. Other additives such as adhesion promoters, anti-static agents, antioxidants, fillers, hydrolysis agents, lubricants, anti-microbial agents, pigments, viscosity modifiers, UV resistance agents may also be included. Examples of these additives include: sterically hindered phenols; diphenylamines; benzofuranone derivatives; butylated hydroxytoluene (BHT); calcium carbonate; barium sulphate; glass fibers; carbon fibers; microspheres; silicas; melamine; carbon black; waxes and soaps; organometallic derivatives of antimony, copper, and arsenic; titanium dioxide; chromium oxide; iron oxide; glycol ethers; dimethyl AGS esters; propylene carbonate; and benzophenone and benzotriazole compounds.

In some embodiments of the present invention, an ester may be added to a thermosetting foam blend. The addition of an ester was surprisingly discovered to further improve the stability of the blend over time, as in extending shelf life of the pre-mix, and enhancing the properties of the resultant foam. Esters useful in the present invention may have the formula R—C(O)—O—R', where R and R' can be $C_aH_c$-bGb, where G is a halogen such as F, Cl, Br, I, a=0 to 15, b=0 to 31, and c=1 to 31, and include esters that are the products obtained by esterification of dicarboxylic acid, phosphinic acid, phosphonic acid, sulfonic acid, sulfamic acid, hydroxamic acid or combinations thereof. Preferred esters are the products obtained by esterification using an alcohol such as methanol, ethanol, ethylene glycol, diethylene glycol, propanol, isopropanol, butanol, iso-butanol, pentanol, iso-pentanol and mixtures thereof; and an acid such as formic, acetic, propionic, butyric, caproic, isocaprotic, 2-ethylhexanoic, caprylic, cyanoacetic, pyruvic, benzoic, oxalic, trifluoacetic, oxalic, malonic, succinic, adipic, azelaic, trifluoroacetic, methanesulfonic, benzene sulfonic acid and mixture thereof. The more preferred esters are allyl hexanoate, benzyl acetate, benzyl formate, bornyl acetate, butyl butyrate, ethyl acetate, ethyl butyrate, ethyl hexanoate, ethyl cinnamate, ethyl formate, ethyl heptanoate, ethyl isovalerate, ethyl lactate, ethyl nonanoate, ethyl pentanoate, geranyl acetate, geranyl butyrate, geranyl pentanoate, isobutyl acetate, isobutyl formate, isoamyl acetate, isopropyl acetate, linalyl acetate, linalyl butyrate, linalyl formate, methyl acetate, methyl anthranilate, methyl benzoate, methyl butyrate, methyl cinnamate, methyl formate, methyl pentanoate, methyl propanoate, methyl phenylacetate, methyl salicylate, nonyl caprylate, octyl acetate, octyl butyrate, amyl acetate/pentyl acetate, pentyl butyrate/amyl butyrate, pentyl hexanoate/amyl caproate, pentyl pentanoate/amyl valerate, propyl ethanoate, propyl isobutyrate, terpenyl butyrate and mixtures thereof. Most preferred esters are methyl formate, ethyl formate, methyl acetate, and ethyl acetate, and mixtures thereof.

The ester can be added in combination with the blowing agent, or can be added separately from the blowing agent into the thermosetting foam blend by various means known in art. The typical amount of an ester is from about 0.1 wt % to 10 wt % of thermosetting foam blend, the preferred amount of an ester is from about 0.2 wt % to 7 wt % of thermosetting foam blend, and the more preferred amount of an ester is from about 0.3 wt % to 5 wt % of thermosetting foam blend.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol pre-mix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials comprise the first component, commonly referred to as the A-side component. The polyol mixture composition, including catalysts, blowing agents, antioxidants, and optional other ingredients comprise the second component, commonly referred to as the B-side component. In any given application, the B-side component may not contain all the above listed components, for example some formulations omit the flame retardant if that characteristic is not a required foam property. Accordingly, polyurethane or polyisocyanurate foams are readily prepared by bringing together the A- and B-side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all incorporated into one B-side component as described above. In some circumstances, the A- and B-sides can be formulated and mixed into one component in which water is removed. Polymerization occurs when the one-component mixture is discharged and exposed to air. This is typical, for example, for a spray-foam canister containing a one-component foam mixture for easy application.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry.

EXAMPLES

The invention is further illustrated by reference to the following Examples. The Examples show the improved stability imparted by the use of an antioxidant, such as 1,2-benzenediol, which imparts stability to the polyol pre-mix composition.

Tables 1A-1F lists the compositions of the Comparative Example and Examples 1-5. The Comparative Example and Example 1 comprised PolyCat® 5 (available from Air Products and Chemicals, Inc.), which contains pentamethyldiethylenetriamine. PolyCat® 5 does not comprise at least one ether and/or at least one hydroxyl group.

Examples 2-5 comprised JEFFCAT® amine catalysts, which are available from Huntsman Corp. JEFFCAT® Z-110 comprises N,N,N'-trimethylaminoethylethanolamine. JEFFCAT® ZR-70 comprises 2-(2-dimethylaminoethoxyl) ethanol. JEFFCAT® ZF-10 comprises N,N,N'-trimethyl-N'-hydroxyethyl-bisaminoethylether. JEFFCAT® ZF-20 comprises bis(2-dimethylaminoethyl)ether.

TABLE 1A

Composition of Comparative Example

| COMPONENT | wt % of Total B-side |
|---|---|
| Voranol 490 | 26.40 |
| Jeffol R-425-X | 30.00 |
| Stepan 2352 | 13.90 |
| Polycat 5 | 0.96 |
| Polycat 8 | 0.24 |
| Tegostab B8465 | 3.00 |
| Water | 1.10 |
| HCFO1233zd | 24.40 |
| A-side/B-side | 1.01 |

TABLE 1B

Composition of Example 1

| COMPONENT | wt % of Total B-side |
|---|---|
| Voranol 490 | 26.05 |
| Jeffol R-425-X | 29.60 |
| Stepan 2352 | 13.71 |
| Polycat 5 | 0.96 |
| 1,2-benezenediol | 1.00 |
| Polycat 8 | 0.24 |
| Tegostab B8465 | 2.96 |
| Water | 1.08 |
| HCFO1233zd | 24.40 |
| A-side/B-side | 1.01 |

TABLE 1C

Composition of Example 2

| COMPONENT | wt % of Total B-side |
|---|---|
| Voranol 490 | 25.38 |
| Jeffol R-425-X | 28.84 |
| Stepan 2352 | 13.36 |
| Z-110 | 1.92 |
| 1,2-benezenediol | 1.92 |
| Polycat 8 | 0.23 |
| Tegostab B8465 | 2.88 |
| Water | 1.05 |
| HCFO1233zd | 24.40 |
| A-side/B-side | 1.01 |

TABLE 1D

Composition of Example 3

| COMPONENT | wt % of Total B-side |
|---|---|
| Voranol 490 | 25.26 |
| Jeffol R-425-X | 28.71 |
| Stepan 2352 | 13.30 |
| ZR-70 | 2.08 |
| 1,2-benezenediol | 2.08 |
| Polycat 8 | 0.23 |
| Tegostab B8465 | 2.87 |
| Water | 1.05 |
| HCFO1233zd | 24.40 |
| A-side/B-side | 1.01 |

TABLE 1E

Composition of Example 4

| COMPONENT | wt % of Total B-side |
|---|---|
| Voranol 490 | 26.17 |
| Jeffol R-425-X | 29.74 |
| Stepan 2352 | 13.78 |
| ZF-20 | 0.80 |
| 1,2-benezenediol | 0.80 |
| Polycat 8 | 0.24 |
| Tegostab B8465 | 2.97 |
| Water | 1.09 |
| HCFO1233zd | 24.40 |
| A-side/B-side | 1.01 |

TABLE 1F

Composition of Example 5

| COMPONENT | wt % of Total B-side |
|---|---|
| Voranol 490 | 25.53 |
| Jeffol R-425-X | 29.01 |
| Stepan 2352 | 13.44 |
| ZF-10 | 1.70 |
| 1,2-benezenediol | 1.70 |
| Polycat 8 | 0.23 |
| Tegostab B8465 | 2.90 |
| Water | 1.06 |
| HCFO1233zd | 24.40 |
| A-side/B-side | 1.01 |

Initial Stabilization

Table 2 shows the cream time, gel time, and tack free time ("TFT") for each of the exemplary compositions immediately after the compositions were prepared.

TABLE 2

Reaction Times Immediately After Preparation.

| | Cream Time (s) | Gel Time (s) | TFT (s) |
|---|---|---|---|
| Comp. Ex. | 7.0 | 35.0 | 44.0 |
| Ex. 1 | 6.0 | 32.5 | 40.5 |
| Ex. 2 | 6.0 | 28.0 | 37.0 |
| Ex. 3 | 6.5 | 27.5 | 37.5 |
| Ex. 4 | 5.5 | 34.0 | 41.5 |
| Ex. 5 | 5.0 | 31.0 | 39.0 |

As can be seen in Table 2, the presence of the antioxidant stabilized the catalyst even when the composition was used immediately after preparation.

Aged 3 Days

Table 3 shows the cream time, gel time, and tack free time ("TFT") for each of the compositions after the compositions were aged for 3 days.

TABLE 3

Reaction Times After Aging for 3 Days.

| | Cream Time (s) | Gel Time (s) | TFT (s) |
|---|---|---|---|
| Comp. Ex. | 7.5 | 42.0 | 61.5 |
| Ex. 1 | 7.0 | 35.5 | 53.0 |
| Ex. 2 | 6.0 | 32.0 | 45.5 |
| Ex. 3 | 6.0 | 30.5 | 40.5 |
| Ex. 4 | 7.0 | 38.5 | 51.0 |
| Ex. 5 | 6.0 | 32.0 | 42.0 |

As seen in Table 3, the compositions comprising antioxidants in accordance with the present invention exhibited less increase in reaction times when compared to the Comparative Example, which did not contain an antioxidant.

Aged 7 Days

Table 4 shows the cream time, gel time, and tack free time ("TFT") for each of the compositions after the compositions were aged for 7 days.

TABLE 4

Reaction Times After Aging for 7 Days.

| | Cream Time (s) | Gel Time (s) | TFT (s) |
|---|---|---|---|
| Comp. Ex. | 9.5 | 53.0 | 85.0 |
| Ex. 1 | 7.5 | 46.0 | 69.5 |
| Ex. 2 | 6.5 | 35.0 | 48.5 |
| Ex. 3 | 7.0 | 32.5 | 42.5 |
| Ex. 4 | 8.5 | 51.0 | 72.5 |
| Ex. 5 | 7.0 | 38.5 | 51.0 |

After aging the composition for 7 days, the compositions containing an antioxidant in accordance with the present invention continued to show improved reaction times compared to the composition which did not comprise an antioxidant.

Coloration Analysis

The stabilizing effect of the antioxidant was also observed visually. A control comprising a catalyst and blowing agent was prepared and placed in a vial. A second vial was prepared similar to the first vial with the addition of acetic acid. A third vial was prepared similar to the first vial with the addition of 1,2-benzenediol.

The fresh solutions were all substantially colorless. After aging, the first vial darkened significantly. The second vial, containing the acetic acid, also darkened, but not to the degree of the first vial. The third vial, which contained the antioxidant, showed little to no discoloration after aging. FIG. 1 shows the vials in their fresh and aged states.

Reactivity Over Time

Figure 2:
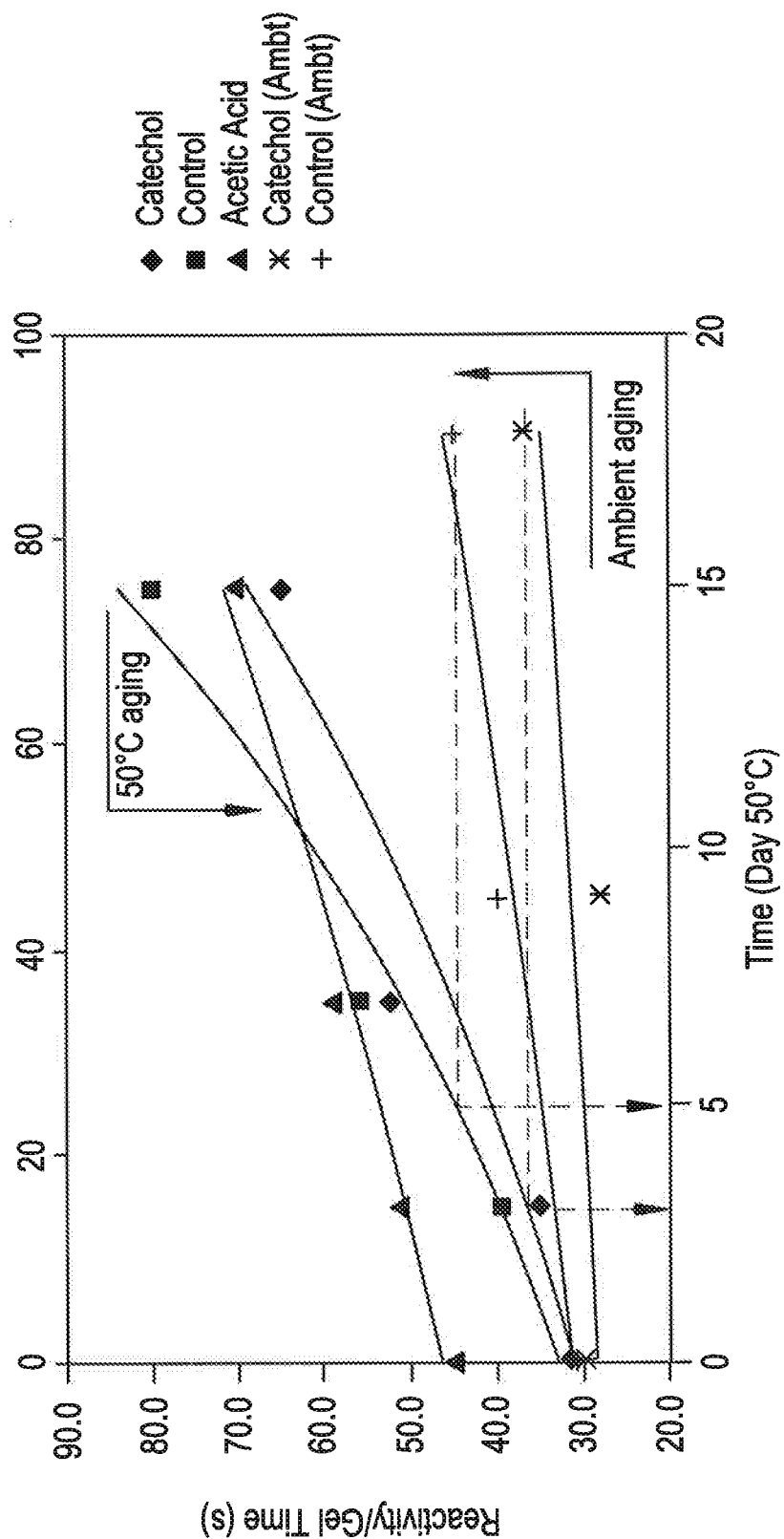
FIG. 2 shows the reactivity over time for the compositions shown in FIG. 1.

FIG. 2 shows the reactivity over time for the solutions shown in FIG. 1. It is evident that the control degraded significantly more over time than the antioxidant stabilized solution. Aging at 50° C. increased the degradation of the catalyst.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A polyol foam B-side pre-mix composition comprising a blowing agent comprising a halogenated hydroolefin, a polyol, a catalyst composition comprising an amine catalyst, a non-amine catalyst, or catalyst mixture thereof, and a primary antioxidant chosen from the group consisting of substituted and unsubstituted 1,2-benzenediols, substituted and unsubstituted 1,3-benzenediols and substituted and unsubstituted benzene triols and mixtures thereof wherein said polyol B-side foam premix forms a thermosetting foam when mixed with a polyol foam A-side premix.

2. The polyol foam B-side pre-mix composition of claim 1, wherein the substituted and unsubstituted benzene triol is chosen from the group consisting of substituted and unsubstituted 1,2,3-benzenetriols, substituted and unsubstituted 1,2,4-benzenetriols, and substituted and unsubstituted 1,3,5-benzenetriols and mixtures thereof.

3. The polyol foam B-side pre-mix composition of claim 1, wherein the primary antioxidant is present in an amount ranging from 0.01 wt % to 20 wt % antioxidant based on the total weight of the polyol pre-mix.

4. The polyol foam B-side pre-mix composition of claim 1, further comprising a secondary antioxidant chosen from the group consisting of phenylene diamine, phosphites, sulfides, sulfites, and mercaptides and mixtures thereof.

5. The polyol currently amended foam pre-mix composition of claim 1, wherein the catalyst composition comprises an oxygen-containing amine catalyst.

6. The polyol B-side foam pre-mix composition of claim 5, wherein the oxygen-containing amine catalyst is an alkanolamine, ether amine, or a morpholine group-containing catalyst.

7. The polyol B-side foam pre-mix composition of claim 5, wherein the oxygen-containing amine catalyst is a compound having the chemical structure:

$$R^1R^2N(CH_2)_2X$$

wherein:
- $R^1$ and $R^2$ are the same or different and are each a $C_1$-$C_6$ alkyl group and/or an alkanol group,
- X is $O(CH_2)_2Y$, OH, or $NR_3(CH_2)_2Y$, where $R^3$ is a $C_1$-$C_6$ alkyl group or an alkanol group, and
- Y is OH or $NR^4R^5$, where $R^4$ and $R^5$ are the same or different and are each a $C_1$-$C_6$ alkyl group or an alkanol group, subject to the proviso that the compound contains at least one ether and/or hydroxyl group.

8. The polyol B-side foam pre-mix composition of claim 1, wherein the catalyst composition comprises a non-oxygen-containing amine catalyst.

9. The polyol B-side foam pre-mix composition of claim 1, wherein the catalyst composition further comprises a non-amine catalyst.

10. The polyol B-side foam pre-mix composition of claim 9, wherein the non-amine catalyst comprises an organometallic salt of tin (Sn) or lead (Pb) or mixtures thereof.

11. The polyol B-side foam pre-mix composition of claim 1, wherein the blowing agent additionally comprises one or more hydrofluorocarbons (HFCs), hydrofluoroethers (HFEs), hydrocarbons, alcohols, aldehydes, ketones, ethers/diethers, or $CO_2$ generating materials, or combinations thereof.

12. The polyol B-side foam pre-mix composition of claim 1, wherein the blowing agent comprises a halogenated hydroolefin selected from the group consisting of hydrofluoroolefins (HFOs), hydrochlorofluoroolefins (HCFOs), and mixtures thereof, and optionally one or more hydrofluorocarbons (HFCs), hydrofluoroethers (HFEs), hydrocarbons, alcohols, aldehydes, ketones, ethers/diethers, esters, or carbon dioxide generating materials.

13. The polyol B-side foam pre-mix composition of claim 12, wherein said hydrocarbons are selected from the group consisting of normal pentane, isopentane, cyclopentane, neopentane, and butane.

14. The polyol B-side foam pre-mix composition of claim 1, further comprising a surfactant.

15. The polyol B-side foam pre-mix composition of claim 14, wherein the surfactant comprises a polysiloxane polyoxyalkylene block co-polymer silicone surfactant.

16. The polyol B-side foam pre-mix composition of claim 1, wherein the pre-mix composition is comprised of from about 0.3 to about 5 weight percent of one or more metal carboxylates, acetylacetonates, and alcoholates based on the total weight of the polyol pre-mix composition.

17. The polyol B-side foam pre-mix composition of claim 1, further comprising a metal salt.

18. The polyol B-side foam pre-mix composition of claim 17, wherein the metal salt comprises a carboxylate, alcoholate, and/or amidinate of a metal selected from the group consisting of Zn, Co, Ca, Mg, Bi, K, and Sn.

19. The polyol B-side foam pre-mix composition of claim 17, wherein the metal salt comprises a carboxylate, alcoholate, and/or amidinate of a C1-C21 carboxylic acid or alcohol.

20. The polyol B-side foam pre-mix composition of claim 17, wherein the metal salt comprises a carboxylate, alcoholate, and/or amidinate of a C1-C21 straight chain or branched aliphatic monocarboxylic acid or monoalcohol.

21. The polyol B-side foam pre-mix composition of claim 17, wherein the metal salt is selected from the group consisting of magnesium formate, zinc octoate, calcium octoate, cobalt octoate, magnesium octoate, bismuth octoate, potassium octoate, and stannous octoate, magnesium acetylacetonate, zinc acetylacetonate, calcium acetylacetonate, cobalt acetylacetonate, bismuth acetylacetonate, potassium acetylacetonate, and tin acetylacetonate, and mixtures thereof.

22. The polyol B-side foam pre-mix composition of claim 1, further comprising at least one flame retardant or suppressor.

* * * * *